(12) United States Patent
Stephens

(10) Patent No.: US 8,386,403 B2
(45) Date of Patent: Feb. 26, 2013

(54) DISTRIBUTED-TYPE MARKOV CHAIN MONTE CARLO

(75) Inventor: James H. Stephens, Austin, TX (US)

(73) Assignee: Empire Technology Development LLC, Wilmington, DE (US)

( * ) Notice: Subject to any disclaimer, the term of this patent is extended or adjusted under 35 U.S.C. 154(b) by 489 days.

(21) Appl. No.: 12/716,084

(22) Filed: Mar. 2, 2010

(65) Prior Publication Data

US 2011/0218944 A1    Sep. 8, 2011

(51) Int. Cl.
*G06F 15/18* (2006.01)
(52) U.S. Cl. .......................................................... 706/12
(58) Field of Classification Search ................... 706/12, 706/45, 62
See application file for complete search history.

(56) References Cited

U.S. PATENT DOCUMENTS

| | | | |
|---|---|---|---|
| 6,640,191 B1 * | 10/2003 | Deem et al. ................. | 506/23 |
| 2004/0010399 A1 | 1/2004 | Kadane et al. | |
| 2006/0023723 A1 | 2/2006 | Morara | |
| 2006/0101104 A1 * | 5/2006 | Bhanot et al. ............... | 708/105 |
| 2007/0076669 A1 | 4/2007 | Farhang-Boroujeny et al. | |
| 2007/0294508 A1 | 12/2007 | Sussman et al. | |
| 2008/0100617 A1 | 5/2008 | Keller et al. | |
| 2009/0003483 A1 | 1/2009 | Farhang-Boroujeny et al. | |
| 2009/0083554 A1 | 3/2009 | Belmont et al. | |

OTHER PUBLICATIONS

Altekar, Gautam et al, Parallel metropolis coupled markov chain Monte Carlo for Bayesian phylogenetic inference, Bioinformatics Advance Access, Jan. 22, 2004, p. 407-415, vol. 20, No. 3, Oxford University Press.
Brockwell, A.E., Parallel Markov Chain Monte Carlo Simulation by Pre-Fetching, Mar. 2006, Journal of Computational and Graphical Statistics, vol. 15, No. 1, pp. 246-261, The Institute of Mathematical Statistics, USA.
Byrd, Jonathan et al, Reducing the run-time of MCMC programs by multithreading on SMP architectures, IEEE International Symposium on Parallel and Distributed Processing, 2008, p. 1-8, IEEE, Miami, Florida.
Byrd, Jonathan et al, Speculative moves: multithreading markov chain monte carlo programs, http://www.cse.buffalo.edu/hpmiccai/pdf/HPMICCAI2008-S1.pdf, accessed on Mar. 1, 2010.
Diaconis, P. The markov chain monte carlo revolution, Bull. Amer. Math. Soc., vol. 46, pp. 179-205, 2009.
Gilks, W.R., Markov Chain Monte Carlo in Practice, Chapman Hall/CRC, Dec. 1996, pp. 1-20, Clays Ltd., Great Britain.
Merritt, Rick, CPU designers debate multi-core future, Feb. 6, 2008, p. 1-2, EE Times, http://www.eetimes.com/showArticle.jhtml?articleID=206105179, accessed on Mar. 1, 2010.
Roberts, G.O., et al, Weak convergence and optimal scaling of random walk metropolis algorithms, The Annals of Applied Probability, 1997, vol. 7, No. 1, pp. 110-120, Institute of Mathematical Statistics, USA.
Srinivasan, Ashok, et al, Random number generators for parallel applications, Monte Carlo Methods in Chemical Physics, 1998.
White, Martin John, Searching for Supersymmetry with the ATLAS Detector, Dec. 15, 2006, p. 1-214, CERN-THESIS-2008-052.
Yan, Jun et al, Parallelizing MCMC for Bayesian Spatiotemporal Geostatistical Models, Dec. 2007, Statistics and Computing, vol. 17, No. 4, pp. 323-335, Kluwer Academic Publishers, Hingham, MA, USA.
Altekar, et al., Parallel Metropolis coupled Markov chain Monte Carlo for Bayesian phylogenetic inference, Bioinformatics, vol. 20, No. 3, Jan. 2004, pp. 407-415.

(Continued)

*Primary Examiner* — David Vincent

(57) ABSTRACT

Implementations and techniques for distributed-type Markov chain Monte Carlo are generally disclosed.

20 Claims, 5 Drawing Sheets

OTHER PUBLICATIONS

Byrd et al., Reducing the run-time of MCMC programs by multithreading on SMP Architectures, IEEE International Symposium, Dec. 2008, IEEE, Miami, Florida.

Feng et al., PBPI: a high performance implementation of Bayesian phylogenetic inference, In SC '06 Proceedings of the 2006 ACM/IEEE conference on Supercomputing, Nov. 2006.

United States Patent and Trademark Office, International Search Report and Written Opinion of the International Searching Authority for PCT/US2011/023236, mailed on May 10, 2012.

International Search Report for International Patent Application No. PCT/US2011/023236 mailed May 10, 2012.

Altekar, G. et al., "Parallel Metropolis coupled Markov chain Monte Carlo for Bayesian phylogenetic inference," Bioinformatics, vol. 20, No. 3, pp. 407-415, 2004.

Byrd, J.M.R. et al., "Reducing the Run-time of MCMC Programs by Multithreading on SMP Architectures," IEEE International Symposium on Parallel and Distributed Processing, pp. 1-8, Apr. 14-18, 2008.

Feng, X. et al., "PBPI: a high performance implementation of Bayesian phylogenetic inference," In Proceedings of Supercomputing, pp. 10, Nov. 2006.

* cited by examiner

400 A computer program product.

402 A signal bearing medium.

404 at least one of
machine-readable instructions, which, if executed by one or more processors, operatively enable a computing device to:

generate, via a swap core, a plurality of swap proposals associated with a distributed-type Markov chain Monte Carlo procedure;

receive, via a first chain core, one or more of the swap proposals from the swap core;

generating, via the first chain core, a plurality of random numbers;

process, via the first chain core, a current iteration of a first chain portion of the distributed-type Markov chain Monte Carlo procedure based at least in part on the random numbers;

wait, via the first chain core, for a current iteration of a second chain portion of the distributed-type Markov chain Monte Carlo procedure associated with a second chain core to reach a corresponding iteration based at least in part on one or more of the swap proposals;

wherein the generation of random numbers, via the first chain core, proceeds without interruption during the waiting, via the first chain core, for the second chain core to reach a corresponding iteration of the distributed-type Markov chain Monte Carlo procedure; and/or wherein the generation of swap proposals, via the swap core, proceeds without interruption during the waiting, via the first chain core, for the second chain core to reach a corresponding iteration of the distributed-type Markov chain Monte Carlo procedure.

| 406 a computer-readable medium. | 408 a recordable medium. | 410 a communications medium. |

FIG. 4

DISTRIBUTED-TYPE MARKOV CHAIN MONTE CARLO

BACKGROUND

Unless otherwise indicated herein, the approaches described in this section are not prior art to the claims in this application and are not admitted to be prior art by inclusion in this section.

Markov chain Monte Carlo procedures may be utilized in many fields, including engineering, physics, astronomy, biology, finance, cryptography, statistics, social sciences, medicine, and others. Markov chain Monte Carlo applications may often utilize a significant amount of processing power. As a result, Markov chain Monte Carlo applications may be run on high-performance computing systems.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 is an illustration of an example computer program product; and

DETAILED DESCRIPTION

Figure 1:
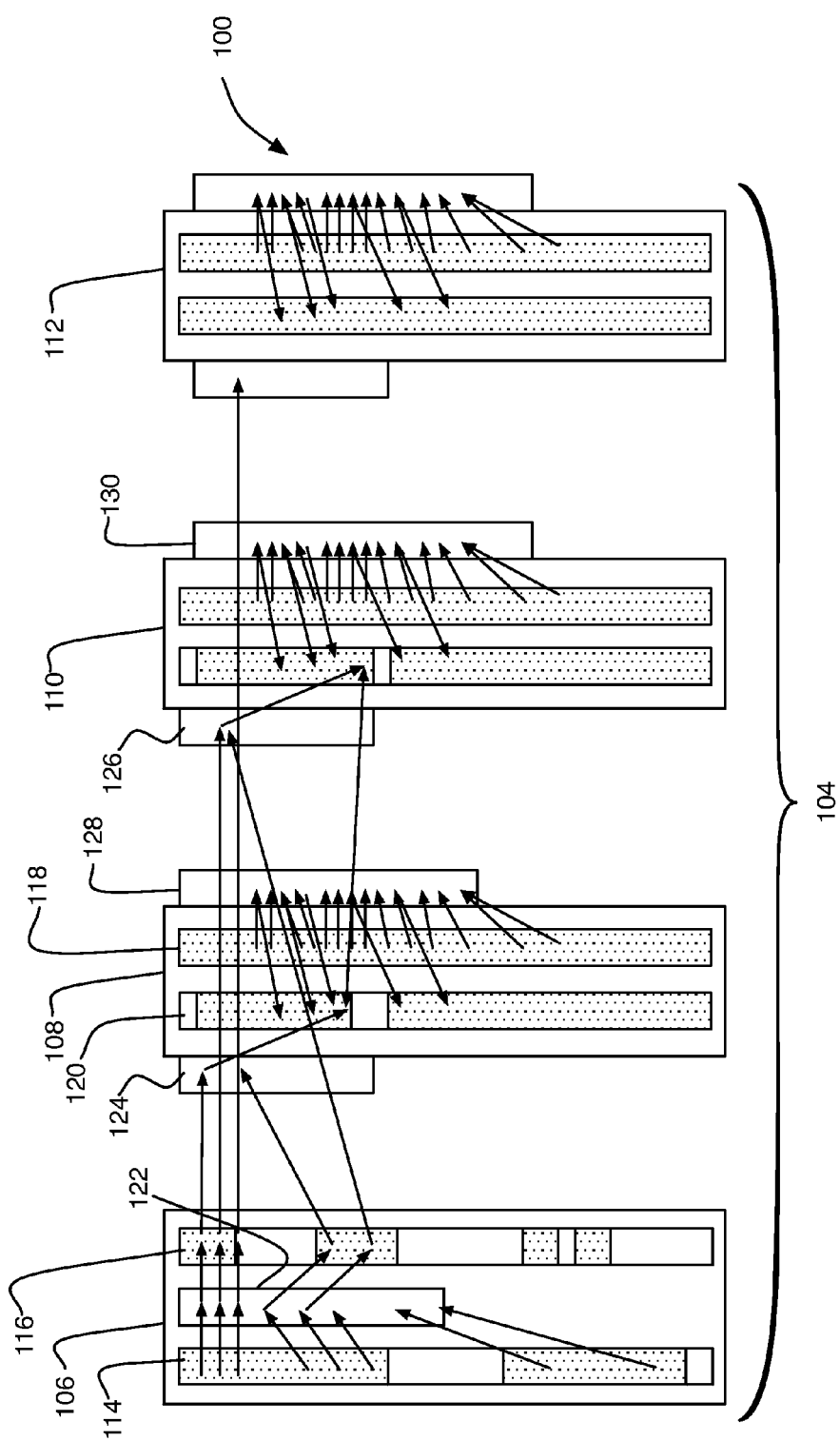
FIG. 1 is an illustration of an example computing device that includes a multicore processor configured to implement distributed-type Markov chain Monte Carlo procedures.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to implementing distributed-type Markov chain Monte Carlo procedures.

As will be described in greater detail below, an improved implementation of distributed-type Markov chain Monte Carlo procedures may be provided for multicore processors. As used herein the term "distributed-type Markov chain Monte Carlo" may refer to any number of Markov chain Monte Carlo procedures that support multiple parallel threads of execution. For example, distributed-type Markov chain Monte Carlo procedures may include Metropolis-coupled-type Markov chain Monte Carlo procedures, speculative-move-type Markov chain Monte Carlo procedures (such as those discussed in J. M. R. Byrd, S. Jarvis, A. Bhalerao "Reducing the run-time of MCMC programs by multithreading on SMP architectures," IEEE International Symposium on Parallel and Distributed Processing 2008 IPDPS 2008, April 2008, for example), pre-fetching-type Markov chain Monte Carlo procedures (such as those discussed in A. Brockwell "Parallel Markov chain Monte Carlo simulation by pre-fetching," *J. Comp. Graph. Stats*, vol. 15, no. 1, 2006, for example), or the like.

A distributed-type Markov chain Monte Carlo procedure may run multiple chains of computation. Various chains periodically may consider swapping states with other chains. At least one of the chains may be a "cold" chain, which may provide a target distribution. Usage of swapping states may improve chances of covering a complex search space. Chains may be be run in parallel, assuming some synchronization to ensure that state swaps occur between chains of the same iteration. One challenge addressed herein is to use available cores as much as possible while maintaining the semantics of the distributed-type Markov chain Monte Carlo procedure, which this synchronization helps to maintain.

As described in greater detail below, the methods, apparatus, and systems may operate so that various chains may not be required to be synchronized simultaneously. In some examples a dedicated "swap" core may host two threads: a swap proposal generation thread and a swap proposal distribution thread. Such a swap proposal core may be configured to generate swap proposals, and distribute such swap proposal information to targeted chains. Accordingly, chains can run almost independently, where a specific chain may be stopped when a swap is proposed for it at a given iteration.

Further, with some Markov chain Monte Carlo procedures, at least two and sometimes all cores may sit idle, stopping chain computation, while waiting for information to determine if a single swap should occur or waiting for exchange the state data itself to finish. As described in greater detail below, the methods, apparatus, and systems may operate so that even a core with a waiting chain does not need to be idle. Instead, when a chain is waiting, that chain's core may be used for random bit generation for future use. In some examples individual "chain" cores may host two threads: a random number generation thread and a chain thread. As the random number generation thread and the chain thread are decoupled, a chain core may continue to process the random number generation thread and need not wait on the operation of the chain thread. Similarly, as the a swap proposal generation thread and a swap proposal distribution thread are decoupled, a swap proposal core may continue to process the swap proposal generation thread and need not wait on the operation of the swap proposal distribution thread.

FIG. 1 is an illustration of an example computing device that includes a multicore processor 100 that is arranged in accordance with at least some embodiments of the present disclosure. Multicore processor 100 may be configured to implement distributed-type Markov chain Monte Carlo procedures. In the illustrated example, multicore processor 100 may include a single integrated circuit having a processing core array. In other examples a multicore processor 100 may include processor cores on separate integrated chips. In addition to or in place of multicore processor 100, a distributed computing environment system (not shown) may be utilized to perform all or a portion of the functions described herein with respect to multicore processor 100. For example, such a distributed computing environment system (not shown) may include, a plurality of computing devices (such as, e.g., a desktop computer, a laptop computer, a workstation, a server device, storage units, or the like), which may be operatively coupled together through a network.

The multicore processor 100 may include some number (N) of processing cores 104(1)-104(N). Any suitable number of processing cores 104 may be provided. For example, multicore processor 100 may have four (4) processing cores 104, tens of processing cores 104, and even hundreds or more of processing cores 104. Some multicore processors 100 may be homogenous, such that each of the processing cores 104 use a single type of core design. Other multicore processors 100 may be heterogeneous, such that one or more of the processing cores 104 may be different from one or more of other processing cores 104, and individual processing cores 104 or a subset of processing cores 104 may be designed for a different role in the multicore processor 100.

Processing cores 104 may include non-shared L1 caches and either shared or non-shared L2 cache(s), and shared system memory. Individual processing cores 104 may support one or more hardware threads. Processing cores 104 may not be exclusively utilized to process a Markov chain Monte Carlo procedure.

FIG. 1 is an illustrative schematic of a multicore processor and does not illustrate physical location of the components illustrated therein. It is appreciated that the multicore processor 100 described herein is illustrative and that examples and modifications are possible. Design choices may be driven by, for example, considerations of hardware size and complexity versus performance, thermal energy and heat dissipation, processor speed, overall throughput, etc.

In the illustrated example, multicore processor 100 may include a plurality of processor cores 104 including a swap proposal core 106 and a plurality of chain cores 108, 110, 112 that are configured in communication with one another. Any suitable number of chain cores 108, 110, 112 may be provided.

In some examples swap proposal core 106 may host two threads: a swap proposal generation thread 114 and a swap proposal distribution thread 116. Such a swap proposal core 106 may be configured to generate swap proposals, and distribute such swap proposal information to targeted chains associated with chain cores 108, 110, 112. As the a swap proposal generation thread 114 and a swap proposal distribution thread 116 are decoupled, swap proposal core 106 may continue to process the swap proposal generation thread 114 and need not wait on the operation of the swap proposal distribution thread 116.

As used herein, the term "swap proposal" may refer to information related to a first chain portion of a distributed-type Markov chain Monte Carlo procedure, a second chain portion of a distributed-type Markov chain Monte Carlo procedure, and a specific iteration of a distributed-type Markov chain Monte Carlo procedure. For example, swap proposal thread 114 may generate swap proposals between two chains at some specified interval(s). This swap proposal data can be represented as a sequence of swap proposal triples $\{<i,j,k>_1, \ldots\}$, that specify that a first chain j's state might be swapped with a second chain k's state at iteration i.

To generate such a swap proposal data sequence, swap proposal core 106 may generate random bits. For example, swap proposal generation thread 114 may generate random bit generation for use in determining (inter-chain) state swaps. Either hardware random bit generators or pseudo-random, software-implemented bit generators can be used for random bit generation.

In some examples individual chain cores 108, 110, 112 may each host two threads: a random number generation thread 118 and a chain thread 120. The process containing random number generation thread 118 and chain thread 120 may be pinned (e.g. via processor affinity or similar directives) to its designated chain core 108, 110, 112. Such pinning may help preserve cache locality as the chain thread 120 searches the space.

As the random number generation thread 118 and the chain thread 120 are decoupled, chain core 108 may continue to process the random number generation thread 118 and need not wait on the operation of the chain thread 120. Random number generation thread 118 may generate random bit generation for use in determining (intra-chain) state transitions. Either hardware random bit generators or pseudo-random, software-implemented bit generators can be used for random bit generation.

Swap proposal core 106 may include a swap proposal generation queue 122. Swap proposal generation queue 122 may be configured to store one or more of the swap proposals generated via swap proposal generation thread 114. Swap proposal generation queue 122 may be implemented as a core-specific buffer or the like. Swap proposal core 106 may be configured to distribute one or more of the swap proposals to chain cores 108, 110, 112 from the swap proposal generation queue 122 via swap proposal distribution thread 116.

Since the resulting swap proposals can be used anytime after they are created, swap proposal core 106 may start generating swap proposals at any time and continue to populate swap proposal generation queue 122 continuously or nearly continuously. Swap proposal core 106 also may process distribution thread 116 to distribute swap proposals to chain cores 108, 110, 112, which host chain threads 120. For example, on request from chain thread 120, distribution thread 116 may distribute one or more swap proposals to that chain thread 120. Distribution thread 116 may operate as the dequeuer of swap proposals from swap proposal generation queue 122.

First chain core 108 may include a swap proposal distribution queue 124. Swap proposal distribution queue 124 may be configured to store one or more of the swap proposals received via first chain core 108. Swap proposal distribution queue 124 may be implemented as a core-specific buffer or the like. An individual chain thread 120 associated with an individual chain core 108 may obtain at least the nearest swap proposal (e.g. the swap proposal nearest with respect to the current iteration) from swap proposal core 106. For example, swap proposal distribution queue 124 associated with chain thread 120 may have a queue of swap proposals associated with first chain core 108. Chain threads associated with other chain cores 110 and 112 may be responsible for keeping respective swap proposal distribution queues filled. For example, a second swap proposal distribution queue 126 may be associated with second chain core 110. Second swap proposal distribution queue 126 may be configured to store one or more of the swap proposals received via second chain core 126.

First chain core 108 may include a random bit queue 128. Random bit queue 128 may be configured to store one or more of the random numbers generated via random number generation thread 118. Random bit queue 128 may be implemented as a core-specific buffers or the like. Likewise, a second random bit queue 130 may be associated with second chain core 110. Random bit queue 130 may be configured to store one or more of the random numbers generated via a random number generation thread associated with second chain core 110.

Since random numbers may be used anytime after they are generated, random number generation thread 118 may be free to run on any schedule, filling random bit queue 128 on any schedule. So an individual chain core 108 may typically access the associated random bit queue 128, and the associated chain thread 120 may remove random numbers from that random bit queue 128.

In operation, before chain thread 120 reaches the next proposed swap iteration, associated chain core 108 may be free to process the chain thread 120 (as well as the random number generation thread 118). Once chain core 108 reaches a specified iteration (e.g. an iteration associated with a received swap proposal), chain thread 120 may wait on the proposed swap chain thread (e.g. a chain thread associated with second chain core 110) to share information sufficient to determine if a swap should occur and, if necessary, swap states. Communications regarding potential swaps may be point-to-point communications (e.g. chain-thread-to-chain-thread). Random numbers generated by the random number generation thread 118 and stored in random bit queue 128 may be consumed during a determination of whether a swap should occur. In some examples, chain thread 120 may request one or more further swap proposals while waiting on another chain thread that has been proposed for a potential swap. Meanwhile, chain core 108 may continue processing random number generation thread 118. Except for the chain cores that are currently considering a potential swap (e.g. first chain core 108 and second chain core 110), the rest of the chain cores (e.g. chain core 112) may be free to continue both random number generation threads and chain threads. During or after the evaluation of a particular swap proposal, the chain cores that are currently considering a potential swap (e.g. first chain core 108 and second chain core 110) may receive a further swap proposal from the swap proposal core 106 (e.g. in cases where respective swap proposal distribution queues 124 and 126 are empty). After a swap is completed, the chain cores 108 and 110 may resume processing the associated chain threads 120. With the above described divisions of labor and point-to-point synchronization, high chain core utilization may be achieved with relatively little inter-core communication.

Figure 2:
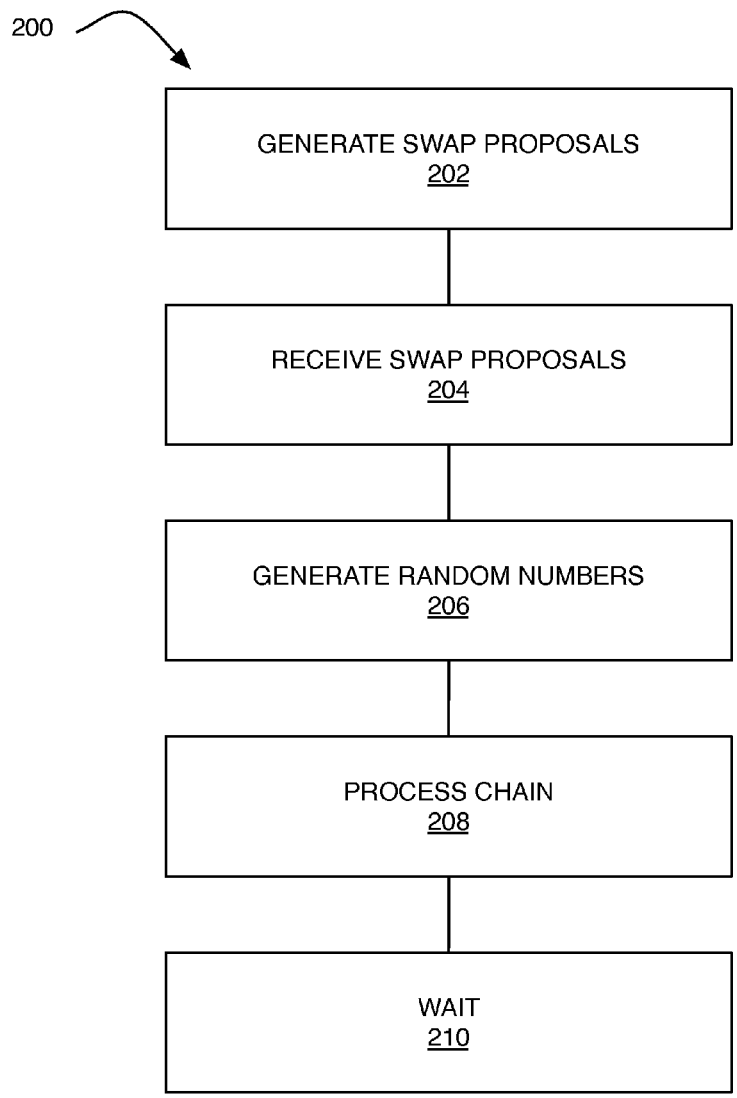
FIG. 2 is an illustration of an example process for operation of a multicore processor configured to implement distributed-type Markov chain Monte Carlo procedures.

FIG. 2 is an illustration of an example process 200 for operation of a multicore processor to maintain usage of cores during implement distributed-type Markov chain Monte Carlo procedures, arranged in accordance with at least some embodiments of the present disclosure. In the illustrated example, process 200, and other processes described herein, set forth various functional blocks or actions that may be described as processing steps, functional operations, events and/or acts, etc., which may be performed by one or more of hardware, software, and/or firmware. Those skilled in the art in light of the present disclosure will recognize that numerous alternatives to the functional blocks shown in FIG. 2 may be practiced in various implementations. For example, although process 200, as shown in FIG. 2, comprises a particular order of blocks or actions, the order in which these blocks or actions are presented does not necessarily limit claimed subject matter to any particular order. Likewise, intervening actions not shown in FIG. 2 and/or additional actions not shown in FIG. 2 may be employed and/or some of the actions shown in FIG. 2 may be eliminated, without departing from the scope of claimed subject matter. Process 200 may include one or more of operations 202, 204, 206, 208, and/or 210.

As illustrated, process 200 may be implemented for operation of a multicore processor to maintain usage of cores during implement distributed-type Markov chain Monte Carlo procedures. Processing may begin at operation 202, "generate swap proposals", where a plurality of swap proposals associated with a distributed-type Markov chain Monte Carlo procedure may be generated via swap proposal core 106 (see FIG. 1). For example, swap proposal thread 114 (see FIG. 1) associated with swap proposal core 106 (see FIG. 1) may generate such swap proposals.

Processing may continue from operation 202 to operation 204, "receive swap proposals", where one or more of the swap proposals may be received, via one or more of chain cores 108, 110, 112 (see FIG. 1), from swap proposal core 106 (see FIG. 1). For example, the swap proposals may be distributed from swap proposal generation queue 122 (see FIG. 1) to be received one or more of chain cores 108, 110, 112.

Operation 206 may occur after, during, and/or before operations 202-204. At operation 206, "generate random numbers", random numbers may be generated, via one or more of chain cores 108, 110, 112 (see FIG. 1). For example, random number generation thread 118 (see FIG. 1) associated with chain core 108 (see FIG. 1) may generate such random numbers.

Processing may continue from operation 206 to operation 208, "process chain", where a current iteration of a chain portion of a distributed-type Markov chain Monte Carlo procedure may be processed via one or more of chain cores 108, 110, 112 (see FIG. 1). Such a chain portion may be processed, based at least in part on the random numbers generated at operation 206. For example, chain thread 120 (see FIG. 1) associated with chain core 108 (see FIG. 1) may process such a chain portion.

Processing may continue from operation 208 to operation 210, "wait", where chain thread 120 (see FIG. 1) may wait for a current iteration of a second chain portion of the distributed-type Markov chain Monte Carlo procedure associated with a second chain core (e.g. chain core 110 of FIG. 1) to reach a corresponding iteration. Such waiting may be based at least in part on one or more of the swap proposals. For example, a given swap proposal may include information related to a specific iteration of a distributed-type Markov chain Monte Carlo procedure, as well as information related to a specific pair of chain portions that are proposed for swapping of state information (e.g. a chain portion associated with chain core 108 and a chain portion associated with chain core 110) (see FIG. 1).

In operation, process 200 may proceed to generate random numbers via chain core 108 without interruption during the waiting of the chain core 108 at operation 228. Likewise, process 200 may proceed to generate swap proposals via swap proposal core 106 without interruption during the waiting of the chain core 108 at operation 228. Additionally, process 200 may proceed to generate swap proposals via swap proposal core 106 without interruption during the distributions of swap proposal distribution thread 116 at operation 204. Further, process 200 may preserves the statistical performance of the distributed-type Markov chain Monte Carlo procedure. For example, statistical adjustments may not need to be made to the results of the distributed-type Markov chain Monte Carlo procedure due to the use of process 200, as compared to results that do not utilize process 200.

Figure 3:
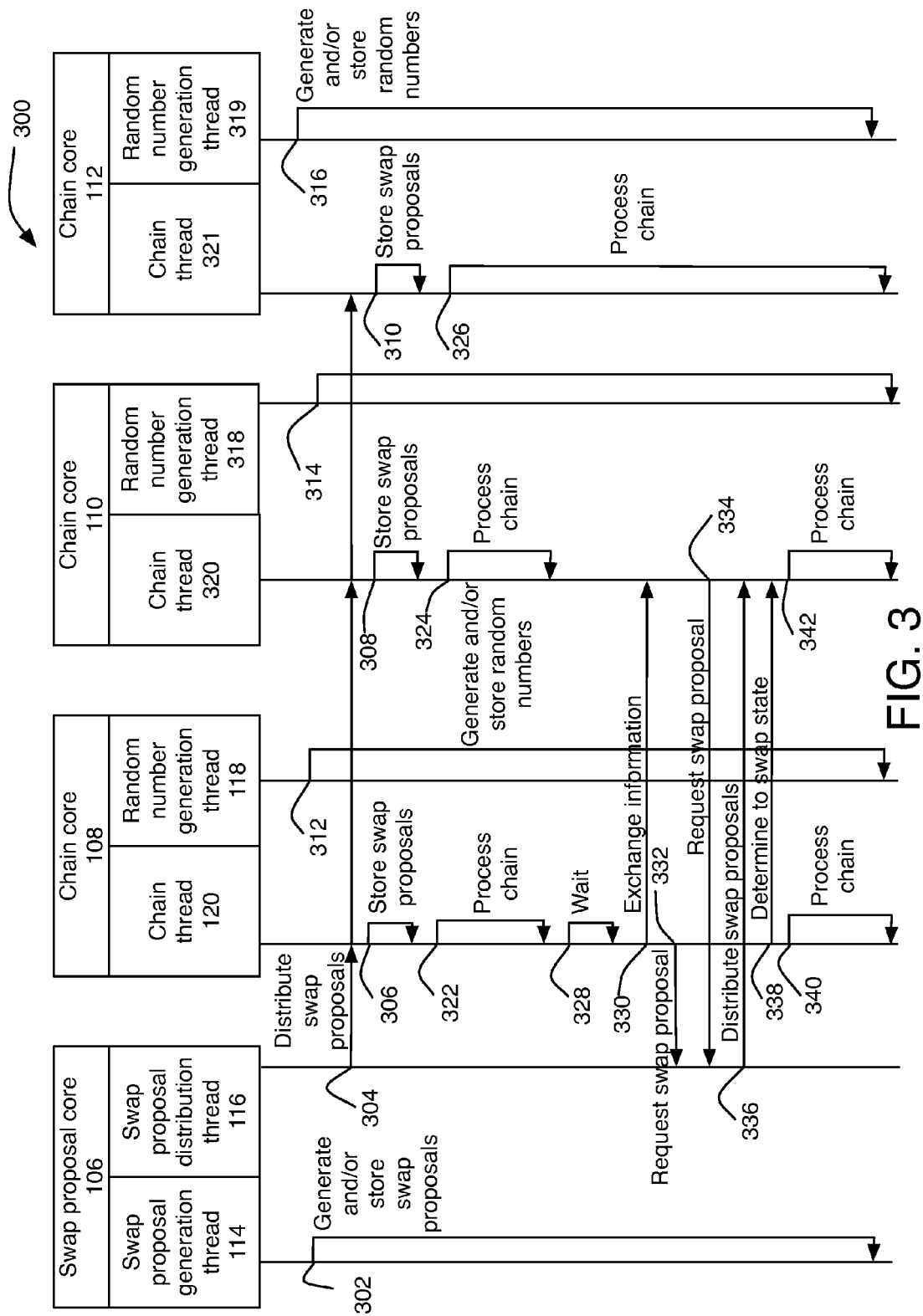
FIG. 3 is an illustration of an example process for operation of a multicore processor configured to implement distributed-type Markov chain Monte Carlo procedures.

FIG. 3 is an illustration of an example process 300 for operation of a multicore processor to maintain usage of cores during implement distributed-type Markov chain Monte Carlo procedures, arranged in accordance with at least some embodiments of the present disclosure. In the illustrated example, process 300, and other processes described herein, set forth various functional blocks or actions that may be described as processing steps, functional operations, events and/or acts, etc., which may be performed by one or more of hardware, software, and/or firmware. Those skilled in the art in light of the present disclosure will recognize that numerous alternatives to the functional blocks shown in FIG. 3 may be practiced in various implementations. For example, although process 300, as shown in FIG. 3, comprises a particular order of blocks or actions, the order in which these blocks or actions are presented does not necessarily limit claimed subject matter to any particular order. Likewise, intervening actions not shown in FIG. 3 and/or additional actions not shown in FIG. 3 may be employed and/or some of the actions shown in FIG. 3 may be eliminated, without departing from the scope of claimed subject matter. Process 300 may include one or more of operations 302, 304, 306, 308, 310, 312, 314, 316, 322, 324, 326, 328, 330, 332, 334, 336, 338, 340 and/or 342.

As illustrated, process 300 may be implemented for operation of a multicore processor to maintain usage of cores during implement distributed-type Markov chain Monte Carlo procedures. Processing may begin at operation 302, "generate and/or store swap proposals", where a plurality of swap proposals associated with a distributed-type Markov chain Monte Carlo procedure may be generated via swap proposal core 106. For example, swap proposal thread 114 associated with swap proposal core 106 may generate such swap proposals. Additionally, such swap proposals may be stored. For example, such swap proposals may be stored in swap proposal generation queue 122 (see FIG. 1).

Processing may continue from operation 302 to operation 304, "distribute swap proposals", where one or more of the swap proposals may be distributed, via swap proposal core 106, to one or more of chain cores 108, 110, and/or 112. For example, the swap proposals may be distributed from swap proposal generation queue 122 (see FIG. 1).

Processing may continue from operation 304 to operation 306, "store swap proposals", where such distributed swap proposals may be received by chain core 108 and potentially stored for later use. For example, such distributed swap proposals may be stored, via swap proposal distribution queue 124 (see FIG. 1). In some examples, similar operations 308 and 310 may occur via chain cores 110 and 112, respectively.

Operations 312-316 may occur after, during, and/or before operations 302-306. At operation 312, "generate and/or store random numbers", random numbers may be generated, via chain core 108, and may be stored, via random bit queue 128 (see FIG. 1) for later use. For example, random number generation thread 118 associated with chain core 108 may generate and/or store such random numbers. In some examples, similar operations 314 and 316 may occur via random number generation threads 318, 319, respectively.

Processing may continue from operation 306 to operation 322, "process chain", where a current iteration of a chain portion of a distributed-type Markov chain Monte Carlo procedure may be processed via chain core 108. Such a chain portion may be processed, based at least in part on the random numbers stored in random bit queue 128 (see FIG. 1). For example, chain thread 120 associated with chain core 108 may process such a chain portion. In some examples, similar operations 324 and 326 may occur via chain threads 320 and 321, respectively.

Processing may continue from operation 322 to operation 328, "wait", where chain thread 120 may wait for a current iteration of a second chain portion of the distributed-type Markov chain Monte Carlo procedure associated with a second chain core (e.g. chain core 110) to reach a corresponding iteration. Such waiting may be based at least in part on one or more of the swap proposals. For example, a given swap proposal may include to information related to a specific iteration of a distributed-type Markov chain Monte Carlo procedure, as well as information related to a specific pair of chain portions that are proposed for swapping of state information (e.g. a chain portion associated with chain core 108 and a chain portion associated with chain core 110).

Processing may continue from operation 328 to operation 330, "exchange information", where chain thread 120 may exchange information with another chain thread (e.g. chain thread 320) sufficient to determine if a swap should occur.

Operations 332-336 may occur after, during, and/or before operations 328-330. At operation 332, "request swap proposal", chain thread 120 may request one or more further swap proposals. For example, chain thread 120 may request one or more further swap proposals while waiting on another chain thread (e.g. chain thread 320) that has been proposed for a potential swap. In some examples, a similar operation 334 may occur via chain thread 320. Processing may continue from operation 332 or 334 to operation 336, "distribute swap proposals", where one or more further swap proposals may be distributed, via swap proposal core 106, to one or more of chain cores 108, 110, and/or 112 upon request. For example, the swap proposals may be distributed from swap proposal generation queue 122 (see FIG. 1), received by chain core 108, and potentially stored for in swap proposal distribution queue 124 (see FIG. 1) for later use.

Processing may continue from operation 330 to operation 338, "determine to swap state", where a determination to swap or not to swap states may occur. For example, first chain core 108 and/or second chain core 110 may be subject to a proposed swap based at least in part on one or more of the swap proposals stored in swap proposal distribution queue 124 (see FIG. 1). On of the chain cores (e.g. first chain core 108 and/or second chain core 110) subject to a proposed swap may determine to swap a based at least in part on the exchange information of operation 330.

Processing may continue from operation 338 to operation 340, "process chain", where a subsequent iteration of the first chain portion may be processed via chain core 108. For example, in cases where states have been swapped, where a subsequent iteration of the first chain portion may be processed based at least in part on the state swapped from the second chain as well as the random numbers stored in random bit queue 128 (see FIG. 1). For example, chain thread 120 associated with chain core 108 may process such a chain portion based at least in part on the state swapped from the second chain thread 320 associated with second chain core 110. In some examples, a similar operation 342 may occur via chain thread 320.

In operation, process 300 may proceed to generate random numbers via chain core 108 without interruption during the waiting of the chain core 108 at operation 328. Likewise, process 300 may proceed to generate swap proposals via swap proposal core 106 without interruption during the waiting of the chain core 108 at operation 328. Additionally, process 300 may proceed to generate swap proposals via swap proposal core 106 without interruption during the distributions of swap proposal distribution thread 116 at operations 304 and 336. Further, process 300 may preserve the statistical performance of the distributed-type Markov chain Monte Carlo procedure. For example, statistical adjustments may not need to be made to the results of the distributed-type Markov chain Monte Carlo procedure due to the use of process 300, as compared to results that do not utilize process 300.

FIG. 4 illustrates an example computer program product 400 that is arranged in accordance with at least some embodiments of the present disclosure. Computer program product 400 may include a signal bearing medium 402. Signal bearing medium 402 may include one or more machine-readable instructions 404 to facilitate communications between multiple collision domain networks of a multicore processor, which, when executed by one or more processors, may operatively enable a computing device to provide the functionality described above with respect to FIG. 1, FIG. 2 and/or FIG. 3. Thus, for example, referring to the system of FIG. 1, multicore processor 100 may undertake one or more of the actions shown in FIG. 2 and/or FIG. 3 in response to instructions 404 conveyed by medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.).

Figure 5:
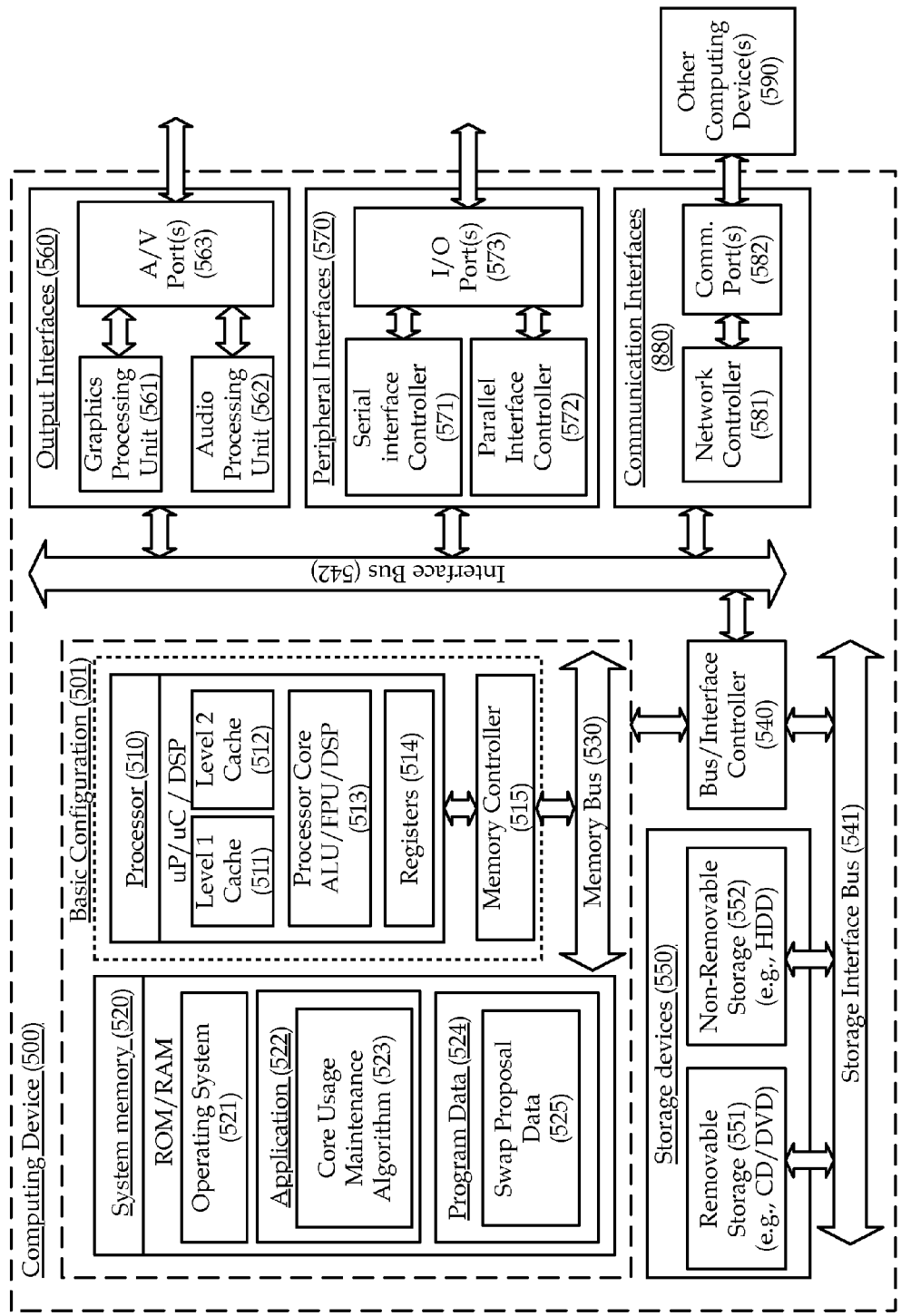
FIG. 5 is a block diagram illustrating an example computing device, all arranged in accordance with at least some embodiments of the present disclosure.

FIG. 5 is a block diagram illustrating an example computing device 500 that is arranged in accordance with at least some embodiments of the present disclosure. In one example basic configuration 501, computing device 500 may include one or more processors 510 and system memory 520. A memory bus 530 can be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include cores usage maintenance algorithm 523 that can be arranged to perform the functions and/or operations as described herein including the functional blocks and/or operations described with respect to process 200 of FIG. 2 and/or process 300 of FIG. 3. Program Data 524 may include swap proposal data 525 for use with the cores usage maintenance algorithm 523. In some example embodiments, application 522 may be arranged to operate with program data 524 on an operating system 521 such that implementations of cores usage maintenance may be provided as described herein. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 590 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method, comprising:
    generating, via a swap proposal core, a plurality of swap proposals associated with a distributed-type Markov chain Monte Carlo procedure;
    receiving, via a first chain core, one or more of the swap proposals from the swap proposal core;
    generating, via the first chain core, a plurality of random numbers;
    processing, via the first chain core, a current iteration of a first chain portion of the distributed-type Markov chain Monte Carlo procedure based at least in part on the plurality of random numbers;
    waiting, via the first chain core, for a current iteration of a second chain portion of the distributed-type Markov chain Monte Carlo procedure associated with a second chain core to reach a corresponding iteration based at least in part on one or more of the swap proposals; and
    wherein the generation of random numbers, via the first chain core, proceeds without interruption during the waiting, via the first chain core, for the second chain core to reach the corresponding iteration of the distributed-type Markov chain Monte Carlo procedure.

2. The method of claim 1, wherein the generation of the plurality of swap proposals, via the swap proposal core, proceeds without interruption during the waiting, via the first chain core, for the second chain core to reach the corresponding iteration of the distributed-type Markov chain Monte Carlo procedure.

3. The method of claim 1 further comprising:
    storing, via a swap proposal generation queue, one or more of the swap proposals; and
    distributing, via the swap proposal core, one or more of the swap proposals to the first chain core from the swap proposal generation queue.

4. The method of claim 1 further comprising storing, via a swap proposal distribution queue, one or more of the swap proposals received via the first chain core, wherein the swap proposal distribution queue is associated with the first chain core and a second swap proposal distribution queue is associated with the second chain core.

5. The method of claim 1, further comprising storing, via a random bit queue, one or more of the plurality of random numbers, wherein the random bit queue is associated with the first chain core and a second random bit queue is associated with the second chain core.

6. The method of claim 1, after the waiting, via the first chain core, for the second chain core to reach the corresponding iteration of the distributed-type Markov chain Monte Carlo procedure, the method further comprising:
    distributing, via the swap proposal core, further swap proposals to the first chain core and the second chain core;
    determining, via the first chain core and/or the second chain core, to swap a state associated with the first chain portion with a state associated with a second chain portion based at least in part on one or more of the swap proposals stored via the swap proposal distribution queue; and
    processing, via the first chain core, a subsequent iteration of the first chain portion based at least in part on the state swapped from the second chain as well as the plurality of random numbers stored via the random bit queue.

7. The method of claim 1, wherein the distributed-type Markov chain Monte Carlo procedure comprises a Metropolis-coupled-type Markov chain Monte Carlo procedure.

8. The method of claim 1, wherein a specific swap proposal comprises information related to the first chain portion, the second chain portion, and a specific iteration.

9. The method of claim 1, wherein the method is adapted to preserve the statistical performance of the distributed-type Markov chain Monte Carlo procedure.

10. A multicore processor including a plurality of processor cores, the multicore processor comprising:
    a swap proposal core configured to generate a plurality of swap proposals associated with a distributed-type Markov chain Monte Carlo procedure;
    a first chain core configured to receive one or more of the swap proposals from the swap proposal core, generate a plurality of random numbers, process a current iteration of a first chain portion of the distributed-type Markov chain Monte Carlo procedure based at least in part on the plurality of random numbers, and wait for a current iteration of a second chain portion of the distributed-type Markov chain Monte Carlo procedure associated with a second chain core to reach a corresponding iteration based at least in part on one or more of the swap proposals; and
    the second chain core configured to process a current iteration of the second chain portion of the distributed-type Markov chain Monte Carlo procedure,
    wherein the first chain core is further configured to continue generation of random numbers without interruption during the wait for the second chain core to reach the corresponding iteration of the distributed-type Markov chain Monte Carlo procedure.

11. The multicore processor of claim 10, wherein the swap proposal core is further configured to continue generation of the plurality of swap proposals without interruption during the wait for the second chain core to reach the corresponding iteration of the distributed-type Markov chain Monte Carlo procedure.

12. The multicore processor of claim 10, further comprising:
a swap proposal generation queue configured to store one or more of the swap proposals, and
wherein the swap proposal core is further configured to distribute one or more of the swap proposals to the first chain core from the swap proposal generation queue.

13. The multicore processor of claim 10, further comprising:
a swap proposal distribution queue configured to store one or more of the swap proposals received via the first chain core, wherein the swap proposal distribution queue is associated with the first chain core; and
a second swap proposal distribution queue configured to store one or more of the swap proposals received via the second chain core, wherein the second swap proposal distribution queue is associated with the second chain core.

14. The multicore processor of claim 10, further comprising:
a random bit queue configured to store one or more of the plurality of random numbers, wherein the random bit queue is associated with the first chain core; and
a second random bit queue configured to store one or more of the plurality of random numbers, wherein the second random bit queue is associated with the second chain core.

15. A computing device including a plurality of processor cores, the computing device comprising:
a multicore processor, comprising:
a swap proposal core configured to generate a plurality of swap proposals associated with a distributed-type Markov chain Monte Carlo procedure,
a first chain core configured to receive one or more of the swap proposals from the swap proposal core, generate a plurality of random numbers, process a current iteration of a first chain portion of the distributed-type Markov chain Monte Carlo procedure based at least in part on the plurality of random numbers, and wait for a current iteration of a second chain portion of the distributed-type Markov chain Monte Carlo procedure associated with a second chain core to reach a corresponding iteration based at least in part on one or more of the swap proposals,
the second chain core configured to process a current iteration of the second chain portion of the distributed-type Markov chain Monte Carlo procedure, and
wherein the first chain core is further configured to continue generation of random numbers without interruption during the wait for the second chain core to reach the corresponding iteration of the distributed-type Markov chain Monte Carlo procedure;
a memory bus; and
a system memory configured in communication with the multicore processor via the memory bus.

16. The computing device of claim 15, wherein the swap proposal core is further configured to continue generation of the plurality of swap proposals without interruption during the wait for the second chain core to reach the corresponding iteration of the distributed-type Markov chain Monte Carlo procedure.

17. The computing device of claim 15, wherein the swap proposal core further comprises a swap proposal generation queue configured to store one or more of the swap proposals, and wherein the swap proposal core is further configured to distribute one or more of the swap proposals to the first chain core from the swap proposal generation queue.

18. The computing device of claim 15, wherein the multicore processor further comprises:
wherein the first chain core further comprises a swap proposal distribution queue configured to store one or more of the swap proposals received via the first chain core;
wherein the second chain core further comprises a second swap proposal distribution queue configured to store one or more of the swap proposals received via the second chain core;
wherein the first chain core further comprises a random bit queue configured to store one or more of the plurality of random numbers, wherein the random bit queue is associated with the first chain core; and
wherein the second chain core further comprises a second random bit queue configured to store one or more of the plurality of random numbers.

19. An article comprising:
a non-transitory medium comprising machine-readable instructions stored thereon, which, if executed by one or more processors, operatively enable a computing device to:
generate, via a swap proposal core, a plurality of swap proposals associated with a distributed-type Markov chain Monte Carlo procedure;
receive, via a first chain core, one or more of the swap proposals from the swap proposal core;
generating, via the first chain core, a plurality of random numbers;
process, via the first chain core, a current iteration of a first chain portion of the distributed-type Markov chain Monte Carlo procedure based at least in part on the plurality of random numbers;
wait, via the first chain core, for a current iteration of a second chain portion of the distributed-type Markov chain Monte Carlo procedure associated with a second chain core to reach a corresponding iteration based at least in part on one or more of the swap proposals; and
wherein the generation of random numbers, via the first chain core, proceeds without interruption during the waiting, via the first chain core, for the second chain core to reach the corresponding iteration of the distributed-type Markov chain Monte Carlo procedure, and
wherein the generation of the plurality of swap proposals, via the swap proposal core, proceeds without interruption during the waiting, via the first chain core, for the second chain core to reach the corresponding iteration of the distributed-type Markov chain Monte Carlo procedure.

20. The article of claim 19, further operatively enabling the computing device to:
store, via a swap proposal generation queue, one or more of the swap proposals; and
distribute, via the swap proposal core, one or more of the swap proposals to the first chain core from the swap proposal generation queue;
store, via a swap proposal distribution queue, one or more of the swap proposals received via the first chain core, wherein the swap proposal distribution queue is associated with the first chain core and a second swap proposal distribution queue is associated with the second chain core; and store, via a random bit queue, one or more of the plurality of random numbers, wherein the random bit queue is associated with the first chain core and a second random bit queue is associated with the second chain core.

* * * * *

UNITED STATES PATENT AND TRADEMARK OFFICE
CERTIFICATE OF CORRECTION

PATENT NO.         : 8,386,403 B2
APPLICATION NO.    : 12/716084
DATED              : February 26, 2013
INVENTOR(S)        : Stephens It is certified that error appears in the above-identified patent and that said Letters Patent is hereby corrected as shown below:

On the Title Page, Item (56), under "OTHER PUBLICATIONS", in Column 1, Line 1, delete "et al," and insert -- et al., --, therefor each occurrence throughout the other publications.

On the Title Page, Item (56), under "OTHER PUBLICATIONS", in Column 1, Line 9, delete "2008," and insert -- Apr. 14-18, 2008 --, therefor.

On the Title Page, Item (56), under "OTHER PUBLICATIONS", in Column 1, Line 14, delete "P." and insert -- P., --, therefor.

On the Title Page, Item (56), under "OTHER PUBLICATIONS", in Column 1, Lines 33-35, delete "Altekar, et al., Parallel Metropolis coupled Markov................Jan. 2004, pp. 407-415.".

On Title Page 2, Item (56), under "OTHER PUBLICATIONS", in Column 2, Lines 1-3, delete "Altekar, G. et al., "Parallel Metropolis coupled................pp. 407-415, 2004.".

On Title Page 2, Item (56), under "OTHER PUBLICATIONS", in Column 2, Lines 4-7, delete "Byrd, J.M.R. et al., "Reducing the Run-time................Apr. 14-18, 2008.".

In the Drawings

In Fig. 4, Sheet 4 of 5, in Box "404", Line 8, delete "core ,a" and insert -- core, a --, therefor.

In the Specification

In Column 2, Line 33, delete "may be be" and insert -- may be --, therefor.

In Column 5, Lines 2-3, delete "second chain core 126." and insert -- second chain core 110.--, therefor.

Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 8,386,403 B2

In Column 10, Line 19, delete "(HDD)," and insert -- (HDDs), --, therefor.

In Column 10, Line 21, delete "(SSD)," and insert -- (SSDs), --, therefor.

In Column 10, Line 31, delete "(DVD)" and insert -- (DVDs) --, therefor.